(12) United States Patent
Temple

(10) Patent No.: US 7,097,278 B1
(45) Date of Patent: Aug. 29, 2006

(54) PRINTER AND METHOD OF PRINTING

(75) Inventor: Stephen Temple, Cambridge (GB)

(73) Assignee: Xaar Technology Limited, Cambridge (GB)

(*) Notice: Subject to any disclaimer, the term of this patent is extended or adjusted under 35 U.S.C. 154(b) by 0 days.

(21) Appl. No.: 09/369,543

(22) Filed: Aug. 6, 1999

Related U.S. Application Data (63) Continuation of application No. PCT/GB98/00529, filed on Feb. 19, 1998.

(30) Foreign Application Priority Data

| Feb. 20, 1997 | (GB) | ............................................. 9703512 |
| Sep. 4, 1997 | (GB) | ............................................. 9718847 |

(51) Int. Cl.
  B41J 2/21 (2006.01)
  B41J 2/145 (2006.01)
  B41J 2/15 (2006.01)

(52) U.S. Cl. .......................................... 347/43; 347/40

(58) Field of Classification Search ................ 347/43, 347/40, 41, 42
See application file for complete search history.

(56) References Cited

U.S. PATENT DOCUMENTS

| 4,131,898 A |   | 12/1978 | Gamblin ....................... 347/41 |
| 4,380,771 A |   | 4/1983 | Takatori ....................... 347/43 |
| 4,540,996 A |   | 9/1985 | Saito ............................. 347/43 |
| 5,371,531 A | * | 12/1994 | Rezanka et al. ............... 347/43 |
| 5,598,191 A | * | 1/1997 | Kneezel ........................ 347/40 |
| 5,677,719 A |   | 10/1997 | Granzow ..................... 347/103 |
| 5,710,582 A | * | 1/1998 | Hawkins et al. .............. 347/42 |
| 5,724,079 A | * | 3/1998 | Helinski et al. ............... 347/43 |

FOREIGN PATENT DOCUMENTS

| EP | 023 433 A2 |   | 2/1981 |   |
| EP | 145 025 B1 |   | 6/1985 |   |
| EP | 724 965 A2 |   | 8/1996 |   |
| JP | 55-142658 | * | 11/1980 | .................. 347/43 |
| JP | 59133061 A |   | 7/1984 |   |
| JP | 404010948 | * | 1/1992 | .................. 347/43 |
| JP | 09-052391 A |   | 2/1997 |   |

* cited by examiner

*Primary Examiner*—Thinh Nguyen
(74) *Attorney, Agent, or Firm*—Marshall, Gerstein & Borun (57) ABSTRACT

In a color printhead, print elements for different colors print swaths of pixels in different colors side by side in a first traverse; the printhead and the surface to be printed are indexed, and in the next traverse, further swaths are printed with each new swath overlapping a previous swath in a different color.

31 Claims, 6 Drawing Sheets

Fig. 4(a) Single Row
Fig. 4(b) Double Row Offset
Fig. 4(c) Single Row Interleaved Fig. 4(d)  Fig. 4(e)  Fig. 4(f)  Fig. 4(g)

|   | Pass 1 | Pass 2 | Pass 3 | Pass 4 |  |  |
|---|--------|--------|--------|--------|---|---|
| C ‖ |  |  |  |  |  |  |
| M ‖ |  |  |  |  |  |  |
| Y ‖ |  |  |  |  |  | Edge of paper |
| K ‖ | K | K,Y | K,Y,M | K,Y,M,C | Band 1 |  |
| C ‖ | C | C,K | C,K,Y | C,K,Y,M | Band 2 |  |
| M ‖ | M | M,C | M,C,K | M,C,K,Y | Band 3 |  |
| Y ‖ | Y | Y,M | Y,M,C | Y,M,C,K | Band 4 |  |
| K ‖ | K | K,Y | K,Y,M | K,Y,M,C | Band 5 |  |

*Fig. 6(a)*

| C | CM | CY | CK | CMY | CMK | CYK | CYM | CKM | CKY |
|---|----|----|----|-----|-----|-----|-----|-----|-----|
| M | MY | MK | MC | MYK |     |     |     |     |     |
| Y | YK | YC | YM | YKC |     | etc.|     |     |     |
| K | KC | KM | KY | KCM |     |     |     |     |     |

*Fig. 6(b)*

| C | CK | CY | CM | CKY | CKM | CYM | CKYM |
|---|----|----|----|-----|-----|-----|------|
| M | MC | MK | MY | MCK | MCY | MKY | MCKY |
| Y | YM | YC | YK | YMC | YMK | YCK | YMCK |
| K | KY | KM | KC | KYM | KYC | KMC | KYMC |

*Fig. 6(c)*

PRINTER AND METHOD OF PRINTING

This is a continuation of International Application No. PCT/GB98/00529 filed Feb. 19, 1998, the entire disclosure of which is incorporated herein by reference.

The present invention relates to colour printers comprising a printhead for printing on a substrate and which has an array of printing elements arranged for printing a swath of greater width than that printed by a single printing element when the substrate and printhead are moved relative to one another. A single dot is printed by each print element—which may be an inkjet nozzle, or any similar device as is well known in the art—with the swath as a whole forming a so-called "dot matrix" which is used to represent images on the substrate. Each dot may be overprinted by other dots in different colours superimposed in exact registry to build-up a colour picture. Alternatively the overprinting dots may not be superimposed but may be deposited in close proximity such that the visual effect is that of a single overprinted dot. In both methods the successively printed dots are considered to be in registry with each other, each overprinted dot or group of proximate dots constituting a pixel.

The most widely used "dot matrix" printer configuration is the so-called "serial" printer in which a printhead has four blocks of elements, each block printing in one of the three subtractive primary colours cyan (C), magenta (M), yellow (Y) or in black (K). The printhead is mounted on a movable carriage and is scanned across a substrate whilst printing, the substrate being repeatedly indexed between successive print scans in a direction perpendicular to the scanning direction firstly to allow overprinting of each colour with the other three as required, and then to repeat the process on a further section of the substrate, the printhead being much narrower than the surface of the substrate being printed. The speed at which such a printer configuration can operate is limited by dynamic factors, for example the maximum acceleration to which a printhead may be subjected when changing direction at the end of a scan and yet still print satisfactorily.

In another known "dot matrix" printer configuration, the printhead remains stationary whilst the substrate—which is attached to a rotating drum—is scanned past. Since the printhead is only moved once every revolution of the drum, the dynamic load on the printhead is much reduced, but it is still necessary to index the printhead many times, and correspondingly to scan or traverse the substrate many times before printing is completed in all four colours.

The present invention is directed in its preferred embodiments to providing a colour printer and a colour printing method in which this disadvantage may be reduced.

Accordingly, the present invention consists in a method of colour printing comprising:

(a) printing pixels in swaths of different colours side by side in a repeating pattern in a first relative traverse of a printhead and a surface to be printed, each swath being printed by a respective block of print elements and being wider than a swath printed by a single print element;

(b) relatively indexing the printhead and the surface in a direction other than that of the relative traverse, and (c) in a further relative traverse printing further swaths which at least partially overprint previously printed swaths in registry therewith, each overprinting swath being of a different colour to the swath which it overprints.

Preferably the width of the printhead is greater than the width of the surface, and thus can achieve page-wide printing during each traverse.

Of course, the term "surface" does not necessarily mean the full width of the substrate, but includes that part of it upon which printing is required eg. the effective width of a page, net of its margins.

The invention also provides colour printing apparatus comprising:

a printhead;

means for presenting a surface to the printhead for printing;

means for effecting a relative traverse of the surface and the printhead, the printhead comprising print elements arranged in blocks to print the surface with pixels in swaths of different colours side by side in a repeating pattern during said relative traverse, each swath being wider than that printed by a single print element;

means for relatively indexing the printhead and the surface in a direction other than the direction of relative traverse; and means for controlling the traversing means, the indexing means and the print elements whereby to effect at least one further relative traverse and to effect said relative indexing between traverses so that the or each further traverse at least partially overprints at least one previously printed swath of pixels with a further swath in a different colour in registry therewith.

In another aspect the invention provides a colour printhead comprising an elongate array of blocks of print elements extending side by side in an array direction, the printhead being configured for relatively traversing a surface to be printed in other than the array direction, the blocks being arranged to print swaths of different colours side by side in a repeating pattern during said relative traverse, each swath being wider than a swath printed by a single print element, the arrangement of the blocks being such that relative indexing of the printhead and the surface in the array direction permits printing of further swaths at least partially overprinting previously-printed swaths, each overprinting swath being of a different colour to the swath which it overprints and in registry therewith.

The invention permits printing to be accomplished with a reduced number of relative traverses of the substrate, and further can reduce the amount of printhead movement. Both printing time and the dynamic load on the printhead can thereby be reduced. Additionally, "wet on wet" (the printing of one colour on another during the same traverse) can be avoided.

The blocks of elements may be arranged in groups, the blocks in each group being adapted for printing in different colours from each other, the array comprising at least two groups, a swath printed by a block of one group being at least partially overprinted by a swath printed by a block of another group.

The groups may be of equal width in the array direction.

The blocks may form a repeating pattern of constant pitch.

Within each group the blocks may form a repeating pattern of constant pitch.

Preferably printing is complete when the printhead and the surface have been relatively indexed through one cycle of the repeating pattern.

The print elements may be adapted to print swaths of equal width, and the cyclic pitch of the repeating pattern may be an integral multiple of the swath width.

Preferably the swaths are regularly distributed within the cycle of the repeating pattern.

Thus, in one traverse, each swath may be contiguous with its neighbour or neighbours or there may be spaces (preferably equal spaces) between the swaths. The latter arrangement may facilitate manufacture of the printhead, whereas the former minimises the number of traverses necessary to complete the printing.

The indexing results in the printhead and one edge of the paper moving relatively away from each other. It is to facilitate complete printing near that edge (ie. to permit full overprinting of the first-printed swath by further swaths), that a printhead for use in page-wide printing is wider than the print surface. If there are n different colours it should be wider by (n−1)/n times the cyclic pitch of the repeating pattern.

For conventional full colour printing n=4, the colours being cyan (C), magenta (M), yellow (Y) and black (K), although the invention of course is applicable to other colour printing schemes, in which n is less than or more than 4.

Preferably each relative indexing is by one swath width, although other indexing sequences may be employed provided all colours are used (or at least offered) at each pixel location. The term "printing" as used herein includes disposing a printing element at a printing location without actually printing; for example in a limiting case the colour white is printed on a white surface by so disposing printing elements of all colours but not actuating any of them.

Because the order (sequence) in which colours are printed will vary from swath to swath, some differences in hue may be discernible between (say) a pixel printed in the order CMYK and one printed KCMY, YKCM or MYKC.

Therefore preferably the method comprises adjusting the intensity of printing or overprinting of a pixel according to the order of colour or colours in which it has been or will be printed or overprinted whereby the hue of the completed pixel is unaffected by the order in which its constituent colours were printed.

The apparatus may be configured accordingly.

Interleaving techniques may be employed to increase printing resolution. Thus the control means may be configured to cause overprinting of at least one swath with a swath of the same colour, and to have first relatively indexed the printhead and the surface so that the overprinting prints pixels interpolated between previously-printed pixels of the same colour.

Alternatively the printhead may comprise at least two parallel rows of print elements disposed such that pixels printed by one row are interpolated between pixels printed by the other row or rows.

Alternatively or in addition within each block or group of blocks the print elements may be deployed so as to extend at an angle to the indexing direction and reduce the effective spacing of the pixels in the indexing direction.

The method may be affected accordingly.

The invention will now be described merely by way of example with reference to the accompanying drawings, wherein:

FIGS. 1(*a*) and 1(*b*) show a printer according to;

FIGS. 4(*a*) through to 4(*g*) show various printing sequences implemented by the invention;

FIGS. 6(*a*) to 6(*c*) show various printing sequences implemented by the invention.

Figure 1A:
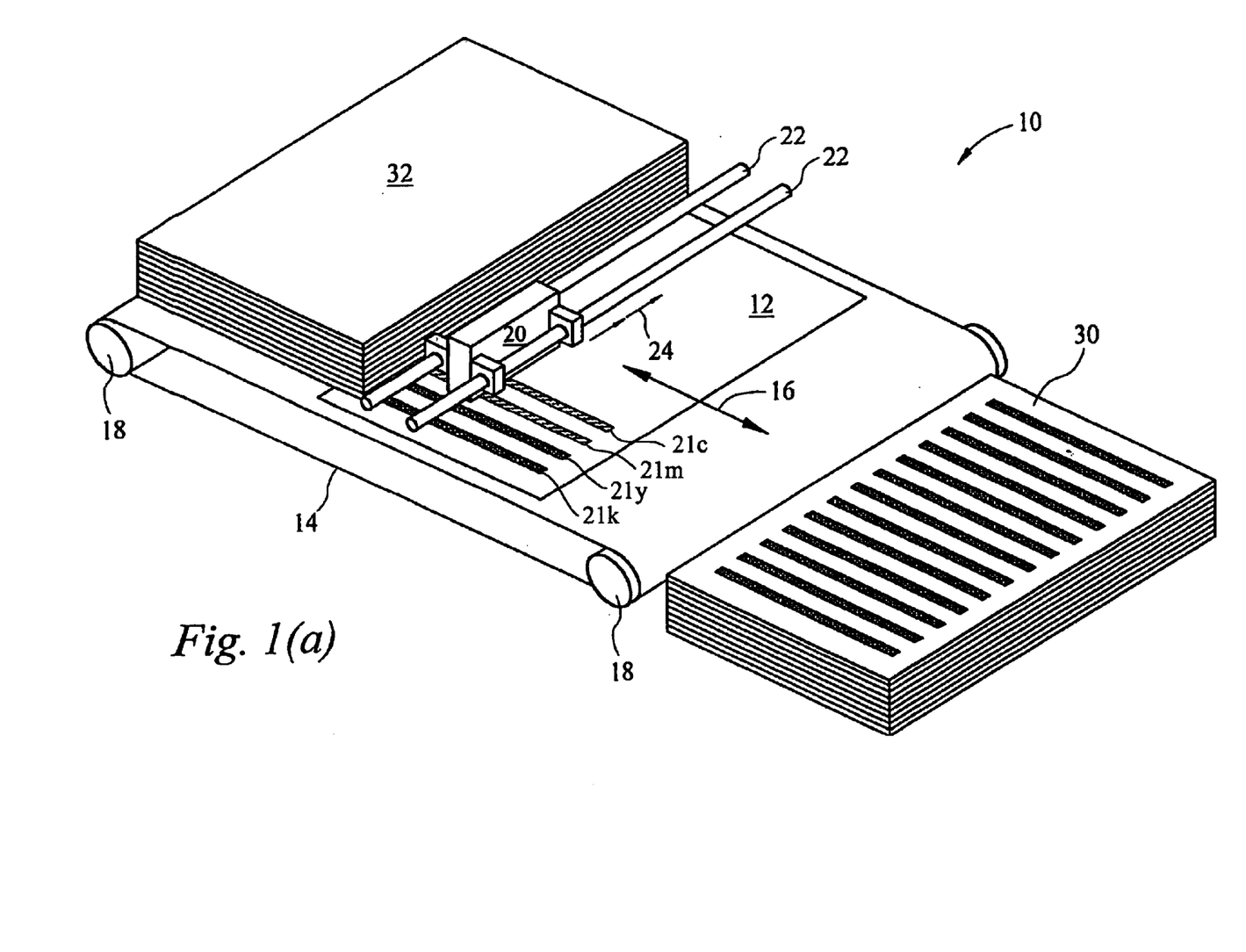
Figure 1B:
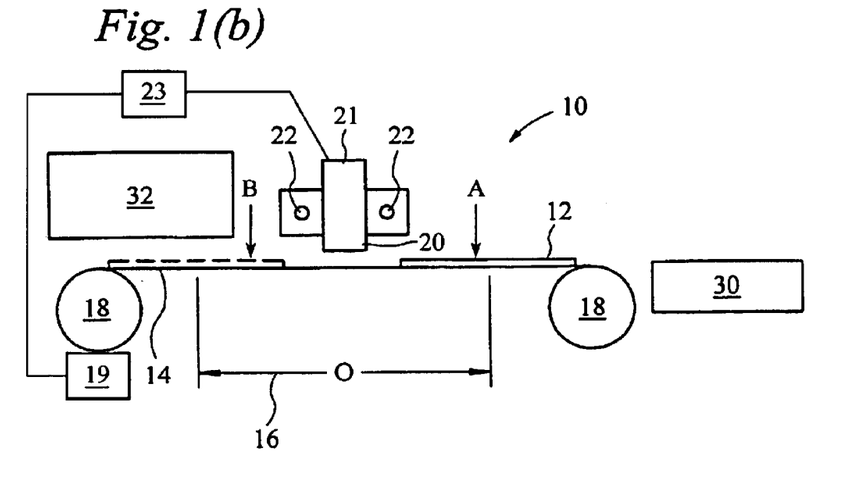

Referring to FIGS. 1(*a*) and 1(*b*), in a printer according to our earlier application a substrate—for example a sheet of paper 12—is carried by a belt 14 supported for oscillatory movement (as indicated by arrows 16) by rollers 18, one at least of which may be controllably driven eg. by a stepping motor. Located above the mid-point of the belt length is the printhead 20, supported for movement along a linear path (indicated by arrow 24) perpendicular to the direction of substrate movement 16, for example by guide rails 22, and driven by indexing means 21. The stepping motor 19 and the indexing means 21 are controlled by control means 23, which also controls the printhead 20.

In the example shown, the printhead 20 comprises a linear print element array arranged parallel to the direction of movement of the printhead and perpendicular to the direction of movement of the substrate relative to the printhead. This need not be the case, however: as long as the formation of a dot matrix is ensured by the printing a swath of greater width than that printed by a single printing element when the substrate is moved along said first path relative to the printhead, the array of print elements may be arranged at any non-zero angle to the direction of movement of the substrate relative to the printhead. Such angling of the array may be desirable on grounds of increasing print resolution. Nor does the array need to be linear.

The array is divided into four contiguous blocks of print elements (eg. channels in an ink jet printer) which print parallel swaths 21*c*, 21*m*, 21*y*, and 21*k* of the four print colours. The swaths are shown separate for clarity, but may in fact abut each other side to side so as to be contiguous.

By means of the belt, the paper is moved from right to left as shown in figure 1(*b*) (from location A shown in solid lines to location B shown in dotted lines) and pass underneath the printhead 20 which prints a first set of 21*c*, 21*m*, 21*y*, 21*k* swaths. The printhead is then indexed by a swath width in direction 24, whereupon the paper is moved from left to right, back to position A, passing underneath the printhead which prints a second swath in which three of the swaths are overprinted and the fourth is a new swath adjacent swath 21*k*.

Many further indexings of the printhead 20 and traverses of the paper allow printing and overprinting across the full width of the surface, at the end of which the paper is released from the belt and into an output tray 30 and a fresh sheet of paper is fed onto the belt from an input stack 32. The range of indexing positions is greater than the printed width so that the swaths at the edges may be addressed by all four colour blocks of the printhead.

It will be appreciated that the printing time per page is heavily dependent on the number of passes or traverses of the paper relative to the printhead, and this in turn is dependent on the narrowness of the printhead compared to the width of the page.

Figure 2:
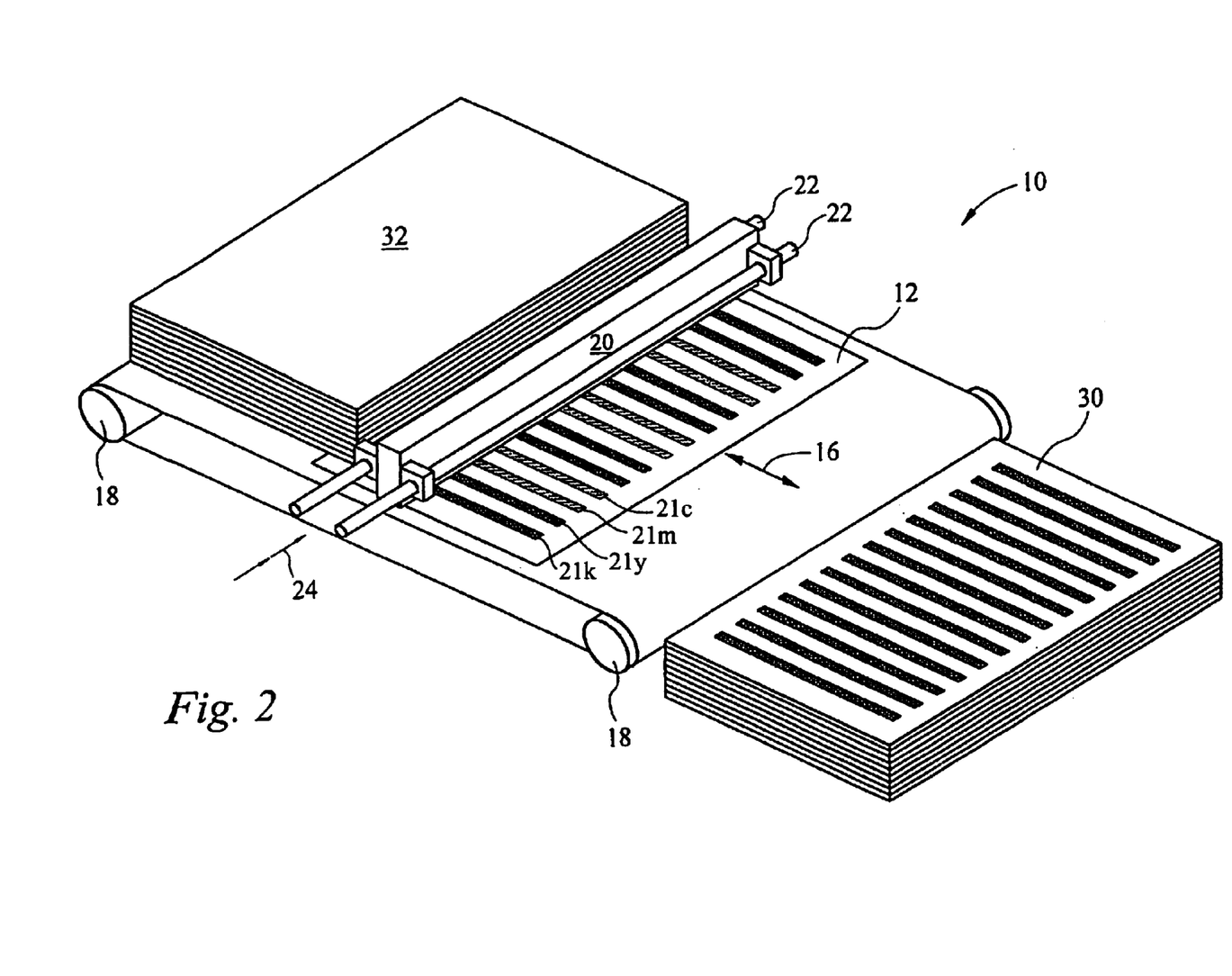
FIG. 2 shows a printer according to the present invention.

Referring to FIG. 2, in a printer according to the invention, the printhead 20 now extends across the full width of the surface to be printed, plus an additional amount determined by the printing regime as discussed below. The printhead consists of a repeating pattern of blocks of elements (FIG. 3*a*), each block being arranged to print one of the colours CMYK, and (in this example) each being contiguous with its neighbours.

In operation, during the first traverse of the paper the printhead lays down swaths 21*c*, 21*m*, 21*y*, 21*k* in the repeating pattern across the full width of the surface to be printed. The printhead is then indexed one swath width, and when the paper is traversed again swaths are again laid down, this time each swath being in registry with and of a different colour to a previously-printed swath. The indexing and printing steps are repeated until each swath has been printed or overprinted in all four colours. Evidently, this enables a much faster throughput than the apparatus of FIG. 1.

Figure 3:
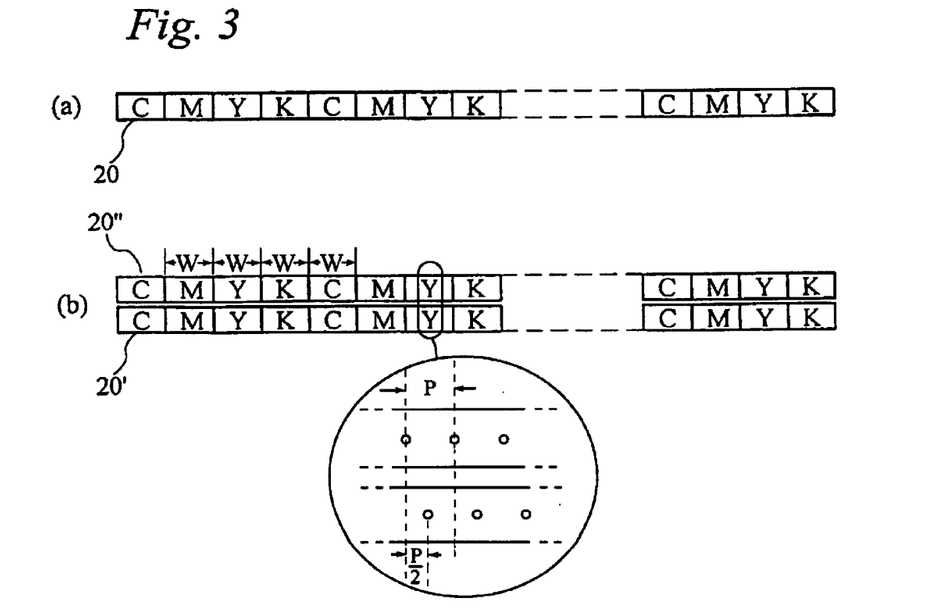
FIG. 3 illustrates printhead configurations for use in the printer of FIG. 2.

The printhead may achieve a higher print resolution than the pitch of its constituent print elements in the colour blocks. This may be done by providing a second parallel row 20″ of print elements as shown in FIG. 3(*b*), in which the elements in row 20″ are offset relative to those in row 20′ by half the pitch p of the elements in each row. Consequently the two rows together print pixels at a pitch p/2, ie. at half the resolution of a single-row head.

Alternatively a single row head may be indexed so that there is an additional traverse for each swath in which pixels are interleaved between previously printed pixels of the same colour. The indexing may be such that the second printing is only displaced p/2 relative to the first, but the mechanical design is easier if it is displaced half a block width plus or minus half a pitch ie. w/2±p/2, where w is the width of the block expressed in element pitches. Other interleaving strategies are possible in which more than one pixel (eg. two or three) is interleaved between the first-printed pixels. In each case the number of traverses is increased in correspondence with the factor by which the element pitch is divided.

In the case of either FIG. 3(*a*) or 3(*b*) the printing elements (eg. nozzles) in each block C, M, Y or K may be arranged so that they are distributed at an angle to both the indexing direction and the traverse direction, the effective separation of the elements thereby being reduced and the resolution of the resulting print being further improved. Alternatively, each group CMYK of blocks may be similarly angled as a whole, relative to the indexing and traverse directions. In all cases movement of the paper and the timing of the operation of each print element must be adjusted to compensate for the displacement of the print elements from a co-linear disposition in the indexing direction. This may be achieved by an appropriate transform in the printhead driving protocol. The principles of such transforms are known per se.

FIG. 4 illustrates a number of printhead configurations and printing sequences according to the invention. Referring first to the simplest case, FIG. 4(*a*), the colour blocks 20′ of a single row printhead are shown diagrammatically as CMYK. They are of width w and produce a repeating pattern of swaths having a pitch s. In this case s=w, and the swaths are contiguous. The figure shows the C swaths of four successive passes or traverses of the paper. It can be seen that after four passes, the printing is complete which is far faster than is achievable with the printer of FIG. 1. The printhead is wider than the finished print surface by the top three blocks CMY in the figure; this extra width or "lead-in" is necessary because the first swath to be fully printed and overprinted in all four colours is the first-occurring K block. Thus if there are n colours, a lead-in of n–1 blocks is required and a complete print requires n passes.

In FIG. 4(*b*) a two-row p/2 offset printhead as shown in FIG. 3(*b*) is employed. Again, a lead-in of n–1 colour blocks is required. This printhead produces a double-resolution print compared to that of FIG. 3(*a*), without extra passes being necessary, the elements in one row being actuated slightly after those of the other row so that the interleaved dots lie in a straight line.

In FIG. 4(*c*) a single row printhead is indexed w/2±p/2 between each pass. Eight (ie. 2*n*) passes are required for a complete double-resolution print, the lead-in again being (n–1) blocks.

The colour blocks, and the swaths they produce, need not be contiguous provided that they still exhibit a repeating pattern of constant block to block (and swath to swath) width regardless of colour. This may facilitate manufacture of the printhead from a series of separate blocks.

Thus by way of illustration, in FIG. 4(*d*) the blocks and their resulting swaths are of width w at a pitch 2*w* ie. there is a gap of width w between each block. The number of passes required for complete printing is now 8. In general however, the gap between the blocks need not be related to the block width. For example it need not be any wider than is indicated by manufacturing and assembly considerations.

Thus for a printhead having k element pitches between corresponding points in successive C blocks (ie. a repeating pattern having a cyclic pitch of k, nw≦k) the number of passes or traverses required for the C swathes completely to cover one cycle of the repeating pattern in k/w, if k is an integral multiple of w, or k/w+1 if it is not. In the former case the swaths will be laid-down edge to edge and will be of full width w. In the second case they will be of reduced width so that k is an integral multiple of that width, the indexing step being likewise reduced, and not all elements of each colour block being utilised. Alternatively the swath width and indexing step may be maintained at w, the final swath being printed at reduced width because it need address only the remainder after dividing k by w.

In all cases, the repeating pattern of colour blocks results in the full width of printing being completed when the printhead has been indexed a distance equal to one cyclic pitch.

In FIG. 4(*e*) double-resolution printing is achieved using a printhead with blocks arranged as in FIG. 3(*b*) except that there is a gap of w/2 between blocks. Here k=6, and printing is completed in six passes, the indexing step being w.

In FIG. 4(*f*) a double-row printhead has its colour blocks in one row offset by w/2±p/2, the gap between blocks being w/2. Again k=6 and six passes are required for a complete double-resolution print.

In FIG. 4(*g*) a single row printhead has an inter-block gap of w/2, and the index step is w/2±p/2 as in FIG. 4(*c*). An interleaved double-resolution print is produced in twelve passes. In general, as with the arrangement of FIG. 4(*c*) the number of passes required for an interleaving strategy is increased in correspondence with the factor by which the element pitch is divided.

Figure 5:
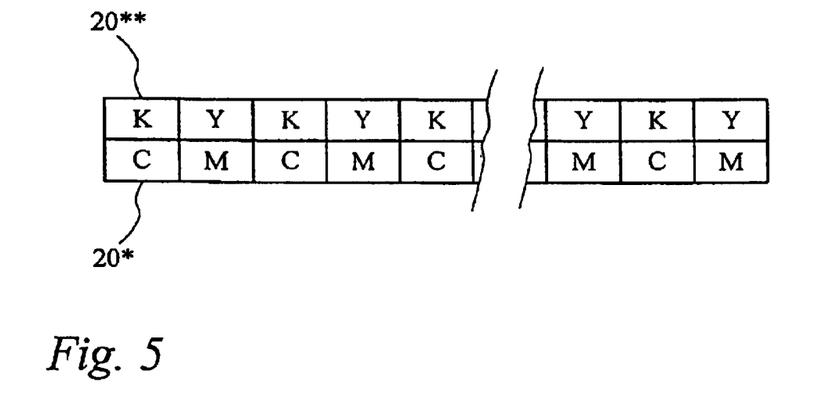
FIG. 5 shows an alternative form of printhead.

FIG. 5 illustrates a variation on the theme of FIG. 3 and FIG. 4(*a*). Instead of the array having blocks of all four colours arranged side by side there may be two parallel arrays 20\*, **20\*\* each having blocks of two colours, the blocks of one array being in registry with the other. In the first printing pass, the elements in array 20\* are actuated. In the second pass the printhead is indexed one block pitch and the array 20\* is actuated again. In the third pass, the printhead is not indexed, and array 20\*\* actuated, with an appropriate adjustment in timing compared to the actuation of array 20\*. In the fourth pass, the printhead is indexed back to its original position, and array 20\*\*** is actuated again. Thus printing is again achieved in four passes; the lead-in overlap is reduced, but at the expense of the provision of two parallel arrays.

Figure 4A:
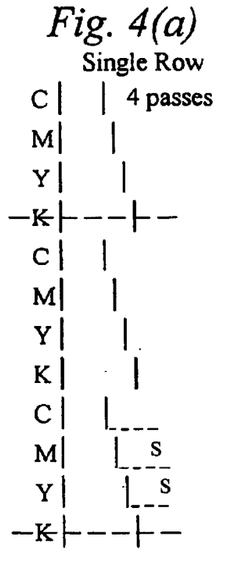
Figure 4B:
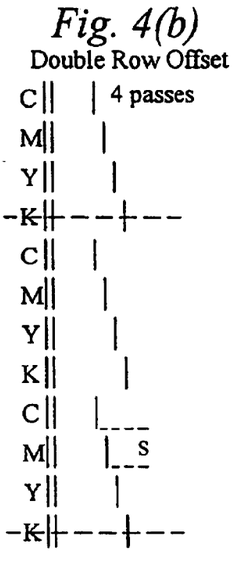
Figure 4C:
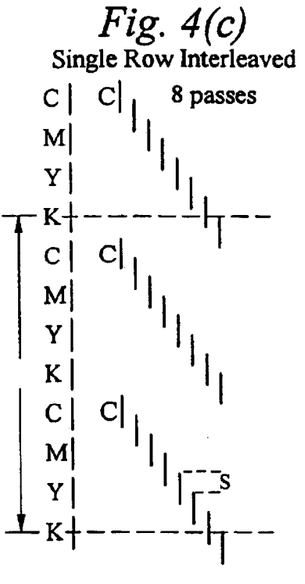
Figure 4D:
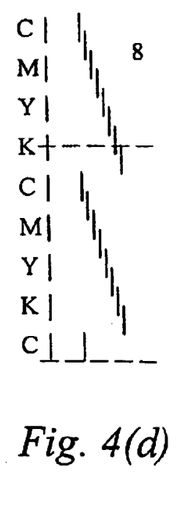
Figure 4E:
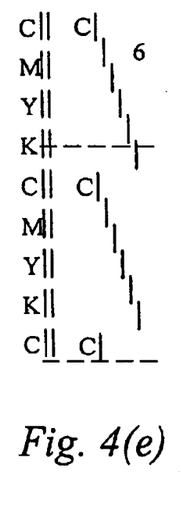
Figure 4F:
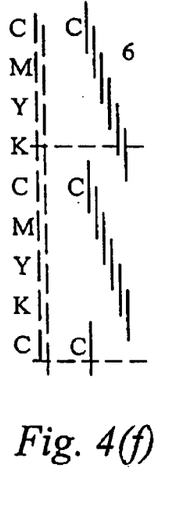
Figure 4G:
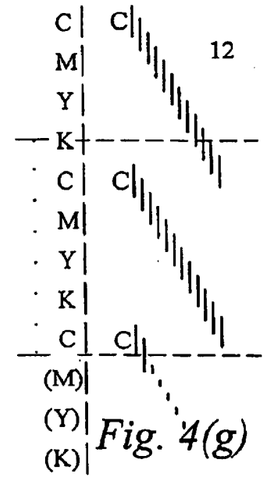
Figure 6A:
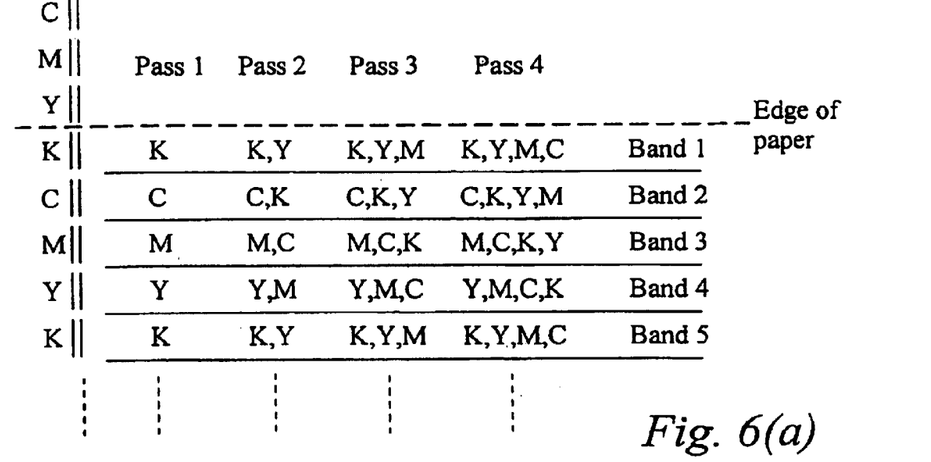

It is a characteristic of the printers here described that the swaths of colours at one location on the printed surface are laid down in a different order to the swaths at another point distant from it by other than the pitch of the repeating pattern. Referring to FIG. 6(*a*) it will be seen that for the printhead configuration of FIG. 4(*b*), the swaths in band 1 of the print adjacent the paper edge are laid down in the order KYMC, whereas in band 2 the order is CKYM, and so on.

Figure 6B:
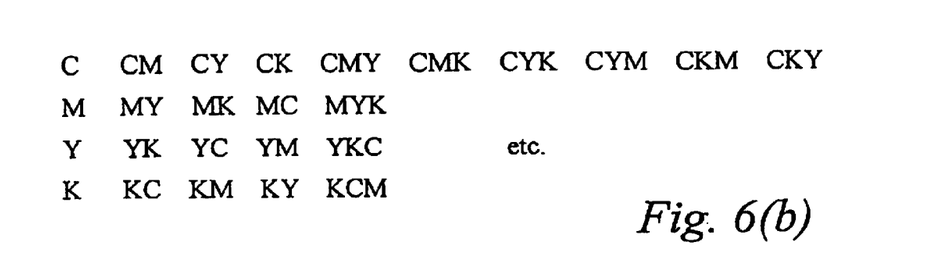
Figure 6C:
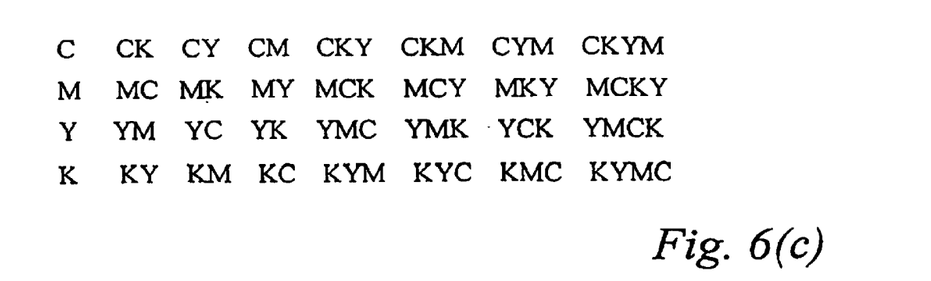

Placing the colours on top of each other in different sequences can produce slight shifts of hue. In order to correct for this the colour processing should take into account all the possibilities and apply them to the relevant swaths. The various colour sequences which may theoretically occur in a CMYK printing process are shown in FIG. 6(b). However not all of these combinations appear in the sequence as printed, so a smaller number of measurements is adequate, as shown in FIG. 6(c).

It may well be found that the order in which black (K) is printed relative to the other colours may not affect the hue of the finished print. In that case a sequence including black can be treated as equivalent to the otherwise-identical sequence in which black is omitted. It may further be found that hue variations can be controlled by considering only two-colour combinations excluding black. Thus, ensuring that CM=MC, MY=YM and YC=CY could well avoid hue variations in a four-colour process, and it is a relatively simple matter to calibrate a printhead design and adjust its print-driving algorithm to achieve these three equalities.

Figure 7:
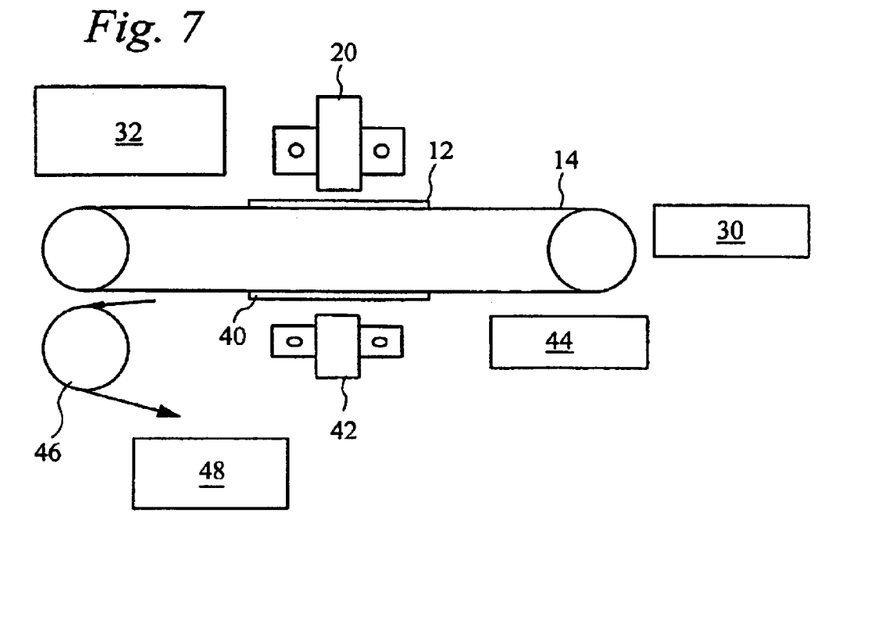
FIG. 7 shows a copier embodying a printer according to the invention.

FIG. 7 illustrates present invention as embodied in a copier, with those elements common to earlier figures having the same reference numbers. A belt 14 not only oscillates the substrate 12 relative to the printhead 20 but also moves the original document 40 which is to be copied past a scanner head 42. Signals corresponding to the image on the document 40 passing the scanner 40 are sent via processing circuitry (not shown) to the printhead 20 which prints a corresponding image on the substrate 12. It will be appreciated that the use of a single (not necessarily continuous) belt to transport both original 40 and copy 12 reduces complexity and may allow the scanner signals to be sent directly for printing at the printhead, avoiding the need for buffer memory. It will be evident that the use of a continuous belt 14 as per FIG. 7 gives a particularly compact construction: original documents may be fed onto the belt 14 from a feeder 44 and removed from the belt after copying by a further sheet feed mechanism 46 for return to the skip 48. Similar efficiency savings may be achieved by coupling the scanner head and the printhead such that they can be moved by a single actuator.

In the examples given above, the substrate is moved relative to the printhead along a linear path, preferably by means of a belt. This allows conventional linear paper handling technology—as used in photocopiers for example—to be employed for feeding paper to and from the printer mechanism. Furthermore, in the particular case of belt conveyors, paper attachment can be achieved by simple, conventional mechanisms such as vacuum or electrostatics. A belt system also has low inertia—an important consideration in a rapidly oscillating system—and can be easily be provided with encoding marks (either on the paper supporting surface or the surface opposite thereto) to ensure registration of belt movement and printhead operation. Apertures can also be formed in a belt to allow maintenance of the printhead from the underside of the belt: this may entail the use of multiple apertures and/or multiple stations for the convention steps of purging, wiping, capping etc. However, this is not to exclude the use of other substrate conveyor means such as rollers, oscillating rather than a rotating drum or any other arrangement permitting multiple passes of the substrate part of the printhead.

It will be evident that the present invention is applicable to any kind of colour printer in which the printhead has an array of printing elements. Such printheads are known generally as "dot matrix" printheads and include inkjet printheads, including thermal and piezoelectric actuation and wire dot matrix printhead.

Each feature disclosed in this specification (which term includes the claims) and/or shown in the drawings may be provided independently of other disclosed and/or illustrated features, or in any appropriate combination.

What is claimed is:

1. A method of colour printing which includes the steps of:
   (a) printing pixels in swaths of different colours side by side in a repeating pattern in a first relative traverse of a printhead and a surface to be printed, each swath being printed by a respective block of print elements with an ink of a single formulation and being wider than a swath printed by a single print element wherein the blocks of elements are arranged in groups in an elongate array, the blocks in each group being adapted for printing in different colours from each other, the array comprising at least two groups and wherein the blocks form a repeating pattern of constant pitch along the array;
   (b) relatively indexing the printhead and the surface in a direction other than that of the relative traverse, and
   (c) in a further relative traverse printing further swaths which at least partially overprint previously printed swaths in registry therewith, wherein each overprinting swath is of a different colour to the previously printed swath which it overprints.

2. A method as claimed in claim 1 wherein a swath printed by a block of one group being at least partially overprinted by a swath printed by a block of another group.

3. A method as claimed in claim 2 wherein the groups are of equal width in the array direction.

4. A method as claimed in claim 1 wherein printing is complete when the printhead and the surface have been relatively indexed through one cycle of the repeating pattern.

5. A method as claimed in claim 1 wherein the blocks of print elements are adapted to print swaths of equal width, and the cyclic pitch of the repeating pattern is an integral multiple of the swath width.

6. A method as claimed in claim 1 wherein the swaths are regularly distributed within the cycle of the repeating pattern.

7. A method as claimed in claim 1 wherein each swath of a traverse is, contiguous with at least one neighboruing swath of that traverse.

8. A method as claimed in claim 1 wherein the width of the printhead is greater than the width of the surface.

9. A method as claimed in claim 8 wherein when there are n said different colours the width of the printhead exceeds that of the surface by $(n-1)/n$ of a pitch.

10. A method as claimed in claim 1 wherein the intensity of printing or overprinting of a pixel is adjusted according to the order of colours in which it has been or will be printed or overprinted whereby the hue of the completed pixel is unaffected by the order in which its constituent colours were printed.

11. A method as claimed in claim 1 wherein the print resolution is increased by overprinting at least one swath with a swath of the same colour having relatively indexed the surface and the printhead so that the overprinting prints pixels interpolated between previously-printed pixels of the same colour.

12. A method as claimed in claim 11 wherein the printhead comprises at least two parallel rows of print elements such that pixels printed by one row are interpolated between pixels printed by the other row or rows.

13. A method as claimed in claim 1 wherein within each block or group of blocks the print elements are deployed so as to extend at an angle to the indexing direction and reduce the effective spacing of the pixels in the indexing direction.

14. Colour printing apparatus comprising:

a printhead;

means for presenting a surface to the printhead for printing;

means for effecting a relative traverse of the surface and the printhead, the printhead comprising print elements arranged in blocks to print the surface with pixels in swaths of different colours side by side in a repeating pattern during said relative traverse, each swath being wider than that printed by a single print element and with ink of the same formulation and wherein the blocks of elements are arranged in groups in an elongate array, the blocks in each group being adapted for printing in different colours from each other, the array comprising at least two groups, a swath printed by a block of one group being at least partially overprinted by a swath printed by a block of another group and wherein the blocks form a repeating pattern of constant pitch along the array;

means for relatively indexing the printhead and the surface in a direction other than the direction of relative traverse; and means for controlling the traversing means, the indexing means and the print elements whereby to effect at least one further relative traverse and to effect said relative indexing between traverses so that each further traverse at least partially overprints at least one previously printed swath of pixels with a further swath in a different colour in registry therewith.

15. An apparatus as claimed in claim 14 wherein the groups are of equal width in the array direction.

16. An apparatus as claimed in claim 14 wherein printing is complete when the printhead and the surface have been relatively indexed through one cycle of the repeating pattern.

17. An apparatus as claimed in claim 14 wherein the blocks of print elements are adapted to print swaths of equal width, and the cyclic pitch of the repeating pattern is an integral multiple of the swath width.

18. An apparatus as claimed in claim 14 wherein the swaths are regularly distributed within the cycle of the repeating pattern.

19. An apparatus as claimed in claim 14 wherein each swath of a traverse is contiguous with at least one neighbouring swath of that traverse.

20. An apparatus as claimed in claim 14 wherein the width of the printhead is greater than the width of the surface.

21. An apparatus as claimed in claim 20 wherein when there are n said different colours the width of the printhead exceeds that of the surface by (n−1)/n of a pitch.

22. An apparatus as claimed in claim 14 wherein the intensity of printing or overprinting of a pixel is adjusted according to the order of colours in which it has been or will be printed or overprinted whereby the hue of the completed pixel is unaffected by the order in which its constituent colours were printed.

23. An apparatus as claimed in claim 14 wherein the print resolution is increased by overprinting at least one swath with a swath of the same colour having relatively indexed the surface and the printhead so that the overprinting prints pixels interpolated between previously-printed pixels of the same colour.

24. An apparatus as claimed in claim 23 wherein the printhead comprises at least two parallel rows of print elements such that pixels printed by one row are interpolated between pixels printed by the other row or rows.

25. An apparatus as claimed in claim 14 wherein within each block or group of blocks the print elements are deployed so as to extend at an angle to the indexing direction and reduce the effective spacing of the pixels in the indexing direction.

26. A colour printhead comprising an elongate array of blocks of print elements extending side by side in an array direction, the printhead being configured for relatively traversing a surface to be printed in other than the array direction, the blocks being arranged to print swaths of different colours side by side in a repeating pattern during said relative traverse, each swath being wider than a swath printed by a single print element and with ink of the same formulation and wherein the blocks of elements are arranged in groups, the blocks in each group being adapted for printing in different colours from each other, the array comprising at least two groups, the arrangement of the blocks being such that relative indexing of the printhead and the surface in the array direction permits printing of further swaths at least partially overprinting previously-printed swaths, wherein each overprinting swath is of a different colour to the previously printed swath which it overprints and wherein the blocks form a repeating pattern of constant pitch along the array.

27. A printhead as claimed in claim 26 wherein the groups are of equal width in the array direction.

28. A printhead as claimed in claim 26 wherein the blocks are contiguous.

29. A printhead as claimed in claim 26 wherein there are two parallel arrays alongside each other.

30. A printhead as claimed in claim 29 wherein the blocks of one array are offset relative to those of the other array so that pixels printed by the blocks of one array are interleaved with pixels printed by the blocks of the other.

31. A printhead as claimed in claim 26 wherein within each block or group of blocks the print elements are deployed so as to extend at an angle to the array direction and reduce the effective spacing of the elements in the array direction.

* * * * *